(12) United States Patent
Haavasoja

(10) Patent No.: US 8,855,923 B2
(45) Date of Patent: Oct. 7, 2014

(54) METHOD AND SYSTEM FOR MAPPING ROAD CONDITIONS BY MEANS OF TERMINALS

(75) Inventor: Taisto Haavasoja, Helsinki (FI)

(73) Assignee: Teconer Oy, Helsinki (FI)

( * ) Notice: Subject to any disclaimer, the term of this patent is extended or adjusted under 35 U.S.C. 154(b) by 0 days.

(21) Appl. No.: 13/513,201

(22) PCT Filed: Dec. 3, 2010

(86) PCT No.: PCT/FI2010/050996
§ 371 (c)(1),
(2), (4) Date: Jul. 25, 2012

(87) PCT Pub. No.: WO2011/067472
PCT Pub. Date: Jun. 9, 2011

(65) Prior Publication Data
US 2012/0283944 A1    Nov. 8, 2012

(30) Foreign Application Priority Data

Dec. 3, 2009    (FI) .................................... 20096280

(51) Int. Cl.
| G01C 21/00 | (2006.01) |
| G06F 17/00 | (2006.01) |
| G06F 19/00 | (2011.01) |
| G01C 21/32 | (2006.01) |
| G08G 1/0967 | (2006.01) |
| G01C 21/36 | (2006.01) |
| G01C 21/34 | (2006.01) |

(52) U.S. Cl.
CPC ............ G01C 21/32 (2013.01); *G01C 21/3691* (2013.01); *G01C 21/34* (2013.01); G08G 1/096791 (2013.01)
USPC ............. 701/411; 701/80; 701/117; 701/118; 701/119; 701/423; 701/424; 701/450

(58) Field of Classification Search
CPC .... G01C 21/32; G01C 21/3691; G01C 21/34; G08G 1/096791
USPC .......... 701/80, 117, 118, 119, 411, 423, 424, 701/450
See application file for complete search history.

(56) References Cited

U.S. PATENT DOCUMENTS

| 5,246,278 A | * | 9/1993 | Yoshino et al. | ................ 303/163 |
| 5,431,242 A | * | 7/1995 | Iwata et al. | .................... 180/197 |

(Continued)

FOREIGN PATENT DOCUMENTS

| DE | 102007042877 A1 | 3/2009 |
| EP | 0731400 A1 | 9/1996 |

(Continued)

OTHER PUBLICATIONS

P. Mohan, V. N. Padmanabhan, and R. Ramjee, Nericell : Rich Monitoring of Road and Traffic Conditions using Mobile Smartphones, In Proc. of ACM SenSys '08, Raleigh, N.C., USA, Nov. 2008.*

(Continued)

*Primary Examiner* — Calvin Cheung
*Assistant Examiner* — Angelina Shudy
(74) *Attorney, Agent, or Firm* — Seppo Laine Oy; Joshua P. Wert

(57) ABSTRACT

The present invention relates to methods, computer software products, server and system for mapping road conditions, especially friction. In the method according to the invention the acceleration of the vehicle is measured by means of an acceleration sensor, the position of the vehicle is monitored by means of positioning means and the measured acceleration value is combined with the position data of the measurement location. The method compares whether the measured position-specific acceleration value exceeds the value on the server for the said area and in case the value is exceeded, a measured position-specific acceleration value is sent to the server.

15 Claims, 3 Drawing Sheets

(56) References Cited

U.S. PATENT DOCUMENTS

| | | | |
|---|---|---|---|
| 6,092,005 A * | 7/2000 | Okada | 701/1 |
| 6,276,189 B1 * | 8/2001 | Hurson | 73/9 |
| 6,418,369 B2 * | 7/2002 | Matsumoto et al. | 701/80 |
| 6,459,988 B1 * | 10/2002 | Fan et al. | 701/468 |
| 6,711,935 B2 * | 3/2004 | Hurson | 73/9 |
| 6,785,611 B2 * | 8/2004 | Ibrahim | 701/301 |
| 8,538,667 B2 * | 9/2013 | Friedlander et al. | 701/117 |
| 8,566,010 B2 * | 10/2013 | Sarma et al. | 701/118 |
| 2002/0007661 A1 * | 1/2002 | Takahashi | 73/9 |
| 2003/0043059 A1 * | 3/2003 | Miller, Jr. | 340/989 |
| 2004/0007064 A1 | 1/2004 | Sakaguchi | |
| 2004/0024529 A1 * | 2/2004 | Ibrahim | 701/301 |
| 2004/0138831 A1 * | 7/2004 | Watanabe et al. | 702/33 |
| 2005/0037730 A1 * | 2/2005 | Montague | 455/404.2 |
| 2005/0038589 A1 * | 2/2005 | Shukla | 701/80 |
| 2005/0049774 A1 * | 3/2005 | Kogure | 701/80 |
| 2005/0065711 A1 | 3/2005 | Dahlgren et al. | |
| 2007/0208496 A1 * | 9/2007 | Downs et al. | 701/117 |
| 2008/0064446 A1 * | 3/2008 | Camp et al. | 455/565 |
| 2008/0071465 A1 * | 3/2008 | Chapman et al. | 701/117 |
| 2008/0114520 A1 * | 5/2008 | Kitazaki et al. | 701/82 |
| 2008/0228329 A1 * | 9/2008 | Hartman | 701/1 |
| 2008/0234921 A1 * | 9/2008 | Groenhuijzen et al. | 701/118 |
| 2009/0002147 A1 * | 1/2009 | Bloebaum et al. | 340/466 |
| 2009/0157267 A1 * | 6/2009 | Shin et al. | 701/51 |
| 2009/0192688 A1 * | 7/2009 | Padmanabhan et al. | 701/70 |
| 2009/0210154 A1 * | 8/2009 | Willis et al. | 701/210 |
| 2009/0241034 A1 * | 9/2009 | Ishizaki et al. | 715/753 |
| 2010/0004838 A1 * | 1/2010 | Georgis et al. | 701/70 |
| 2010/0280751 A1 * | 11/2010 | Breed | 701/207 |
| 2010/0323657 A1 * | 12/2010 | Barnard et al. | 455/404.1 |
| 2011/0077028 A1 * | 3/2011 | Wilkes et al. | 455/456.3 |
| 2011/0136512 A1 * | 6/2011 | Ohkubo | 455/456.3 |
| 2011/0210866 A1 * | 9/2011 | David et al. | 340/903 |
| 2011/0264300 A1 * | 10/2011 | Tuononen | 701/1 |
| 2011/0313823 A1 * | 12/2011 | Ikeuchi et al. | 705/13 |
| 2012/0053805 A1 * | 3/2012 | Dantu | 701/70 |
| 2012/0136529 A1 * | 5/2012 | Curtis et al. | 701/32.2 |
| 2013/0030680 A1 * | 1/2013 | Friedlander et al. | 701/117 |
| 2013/0325308 A1 * | 12/2013 | Friedlander et al. | 701/117 |
| 2013/0338914 A1 * | 12/2013 | Weiss | 701/465 |

FOREIGN PATENT DOCUMENTS

| | | | |
|---|---|---|---|
| EP | 1150266 A2 | | 10/2001 |
| EP | 1291824 A1 | | 3/2003 |
| EP | 819912 B1 | * | 11/2004 |
| EP | 1890128 A2 | | 2/2008 |
| EP | 2295301 A1 | * | 3/2011 |
| EP | 2037219 B1 | * | 12/2011 |
| JP | 07186928 A | * | 7/1995 |
| JP | 2003118555 A | * | 4/2003 |
| JP | 2004175349 A | * | 6/2004 |
| JP | 2007106169 A | * | 4/2007 |

OTHER PUBLICATIONS

"Report on integration of data useful for ROADIDEA system", ROADIDEA 215455, contractual date of delivery Feb. 28, 2009.

"Runway Friction Testing" (Vericom Computers), Products>VC4000 Models>RFM4000X, julkaistu altavistan mukaan internetissä Nov. 18, 2009.

Prashanth Mohan, Venkata N. Padmanabhan, Rmachandran Ramjee: "Nericell: rich monitoring of road and traffic conditions using mobile smartphones", Proceedings of the 6th ACM Conference on Embedded Network Sensor Systems, Nov. 2008, pp. 323-336, XP002628202, Rayleigh, NC, USA.

* cited by examiner

METHOD AND SYSTEM FOR MAPPING ROAD CONDITIONS BY MEANS OF TERMINALS

FIELD OF THE INVENTION

The present invention relates to measuring traffic data by means of utilizing the sensors of data terminal equipment. The invention relates especially to collecting data concerning surface slipperyness and congestion by means of road users' data terminal equipment, such as mobile phones, acceleration sensors and positioning sensors More specifically the present invention relates to methods, server and computer software products according to preambles of claims 1, 6, 7, 10 and 12.

BACKGROUND ART

To ensure efficient flow of traffic it is important that the road network is in efficient condition and that the road users have up-to-date data about the current conditions and any exceptional arrangements. In prior art, data about traffic conditions has been acquired and distributed by means of a number of methods. The effect of weather on traffic conditions has been estimated on the basis weather forecasts as well as data from road weather cameras and weather sensors. Traditionally weather information has been transmitted to road users via radio and, recently, by means of various data terminal equipment. Additionally, along large roads information about slippery road conditions has been transmitted by means of large display billboards. A number of vehicles also include warning systems based on temperature sensors, vehicle stability control system or both, the systems providing the driver with warnings about possibly deteriorated driving conditions. There also are SMS-based services in which customers are provided with weather forecast or weather observation data at, e.g. certain intervals.

In addition to visibility the weather has an effect on driving condition as change of friction between the wheel of a vehicle or the like and road surface. The measurement of the said friction has been the subject of especial interest as it obviously has an immediate effect on the drivability of the vehicle. Defining the friction on the basis of weather observations has been challenging but the actual friction in existing conditions has been estimated in prior art technology by means of a number of acceleration sensor-based solutions. For example, EP 0461934 A2 discloses a slide observation apparatus of a four-wheel-drive car, the apparatus comprising e.g. sensors for longitudinal and transverse acceleration. EP 1452353 A2, on the other hand, discloses a slide observation arrangement for cars, the arrangement comprising three acceleration sensors so that the system includes a sensor for longitudinal, transverse and vertical directions.

The data produced by the acceleration sensors is in prior art processed by means of various arrangements. In the solution of EP 1475763 A1 the data produced by the acceleration sensor is transmitted to the monitoring system of the vehicle analysing the data and transmitting video data in case of emergency to a monitoring company. There are also solutions in which the acceleration sensors are arranged to cooperate with other sensors. For example, U.S. Pat. No. 5,025,401 A discloses observation of sliding of the wheels of the vehicle based on differences between the measurement results of speed sensors and acceleration sensors. Further, US 2009/0210154 A1 is known, disclosing observation of sliding of a railroad vehicle, here based on simultaneous use of movement sensors, acceleration sensors and satellite positioning system.

Data has also been collected by state institutions, such as Finnish Road Administration about the effect of traffic congestion, accidents, road works and similar situations caused by road usage on the flow of traffic and the utilization rate of the roadways has been monitored, among others, by means of traffic cameras. Private parties have also acquired similar data. Data about exceptional conditions has also been transmitted via radio, but lately the data has also been transmitted to road users via navigation apparatuses and the Internet.

There are also projects in which data about the traffic rate is collected directly from the roads users. In a joint project by Berkeley University and Nokia the positioning data of the road users' mobile phones was used for determining the driving speed. On the project, the data obtained from the road users was transmitted to a central computer in which local travel times and congestion data were analysed for further distribution to various applications. In a practical deployment of the data acquisition and transmission was carried out by means of a program uploaded to the phone and anonymously sending GPS-based traffic data to the server.

Thus there are numerous ways of collecting and transmitting data essential to road users about driving conditions, especially the weather and congestion of the roads, both in a central as well as a distributed way.

Prior art has, however, some considerable drawbacks. Currently commonplace navigation systems that provide a real-time route guidance to a certain destination for the driver of a road traffic vehicle are usually based on GPS positioning and map data updated at intervals. The performance of the navigation systems in practical traffic situations, however, depends on local, sometimes quickly developing traffic limitations, such as especially the slipperyness caused by weather, but also traffic jams, accidents and similar unexpected changes in the transmission capacity of the road. If the database of the navigation systems can be quickly updated with data about the changed traffic limitations, the guidance can possibly be changed onto a new route almost immediately after the formation of the limitation. As has been stated above, the current systems receive periodically updated data about the traffic limitations. At best, the response time of the data is, however, of the order of 10 minutes or more. Especially the currently available slipperyness data are far too general to describe the drivability of a certain portion of road and usually they are based on a road weather forecast or deficient road weather measurements. Thus current systems can not quickly transmit reliable data about weather, more especially the real friction of the road surface.

Therefore, the aim of the present invention is to solve at least some of the problems of prior art and to produce a system capable of quickly and reliably transmitting extensive data about existing driving conditions to road users. An especial aim of the invention is achieve a minute level response time for communication.

SUMMARY OF THE INVENTION

The aim of the invention is achieved by a method for producing friction data about the driving conditions with data terminal equipment. In the method the acceleration of the vehicle is measured by means of an acceleration sensor, the position of the vehicle is measured by means of positioning means and the measured acceleration value is combined with the position data of the measurement location. The method compares whether the measured position-specific acceleration value exceeds the value on the server for the said area and in case the value is exceeded, a measured position-specific acceleration value is sent to the server.

More specifically, the method according to the invention for producing the friction data about the driving conditions by means of data terminal equipment.

On the other hand, the aim of the invention is achieved by means of a server arranged to communicate with data terminal equipment belonging to the group of data terminal equipment, the server comprising a position-specific history log. The server is further arranged to receive data produced by the acceleration sensor and positioning means of the data terminal equipment from a number of data terminal equipment units, to save the received data in the position-specific history log of the memory and to compare the received position-specific data with the previous data of the history log. The server is also arranged to form position-specific acceleration data that can be transferred to a number of data terminal equipment units, if the position-specific acceleration values received from data terminal equipment is higher than the previous position-specific acceleration value of the history log.

The invention also provides a method for producing on the server friction data about the driving conditions. In the method, data produced by means of the acceleration sensor and positioning means of the data terminal equipment is received from a number of data terminal equipment units, the received data is saved in memory in a position-specific history log, the received position-specific data is compared with the previous history log of the memory and updated position-specific acceleration data is produced, the data then being transmitted to a number of data terminal equipment units in case the position-specific acceleration value from received the data terminal equipment is larger than the previous position-specific acceleration value in the history log of the server.

Considerable advantages are achieved with the present invention. Namely, use of the invention allows informing the road users about changed driving conditions with a very short response time before the deterioration of the driving conditions has even has had a chance of having an effect on the flow of traffic. In the best case the response time of information can be reduced from tens of minutes to a level of minutes. Thus, by means of the invention communication about slipperyness, traffic congestion or other similar exceptional conditions can be changed from reactive to proactive. The advantage of the friction determined by means of an acceleration sensor according to the invention is additionally that the measurement is absolute with no need for work-intensive calibrations.

When using mobile phones as data terminal equipment almost any intelliphone can be converted to a data terminal equipment unit suitable for carrying out the invention with a software update, as current intelliphones often already integrally include the components necessary for the invention. Thus, it will suffice for the user in a preferable case to just download the software to the phone, subsequent to which he can participate in distributing and receiving data without complex equipment. When using mobile phones for measurements in road traffic applications, the ready communication connections, GPS positioning data, camera and a large saving capacity are further advantages. Additionally, the results of the acceleration sensors of the mobile phone are usually three-dimensional, whereby the phone can be installed in the car in any position and the friction is measured from the acceleration measured in the direction of movement. The direction of movement can be determined by means of a small application of brake in calibration state. Another alternative is to have the direction of movement determined by software as a direction on average perpendicular to the gravity of the earth having acceleration and deceleration, especially during starting and stopping. Thus it is not necessary to have the phone permanently attached to the car, but the position of the phone can be determined by software.

According to one embodiment the data terminal equipment only sends data to the server if the acceleration value measured by it is different from the value in the database of the data terminal equipment. This embodiment provides the advantage that the data transmitted from the data terminal equipment can be minimized for minimizing the data transfer costs.

BRIEF DESCRIPTION OF THE DRAWINGS

In the following, some embodiments of the invention are inspected by means of reference to the appended drawings, in which.

DETAILED DESCRIPTION OF EMBODIMENTS

In the present embodiment the data collected about the traffic conditions is thus based on centralized data produced and transmitted by road users. On one hand, the data sent by the road users is position data that according to the embodiment can be produced by means of alternative ways, and on the other hand it is data produced by the acceleration sensor of the data terminal equipment that can also have been produced by means of alternative ways. Transmission and analysing of the data can also be carried out in alternative ways according to different embodiments of the invention.

Figure 1:
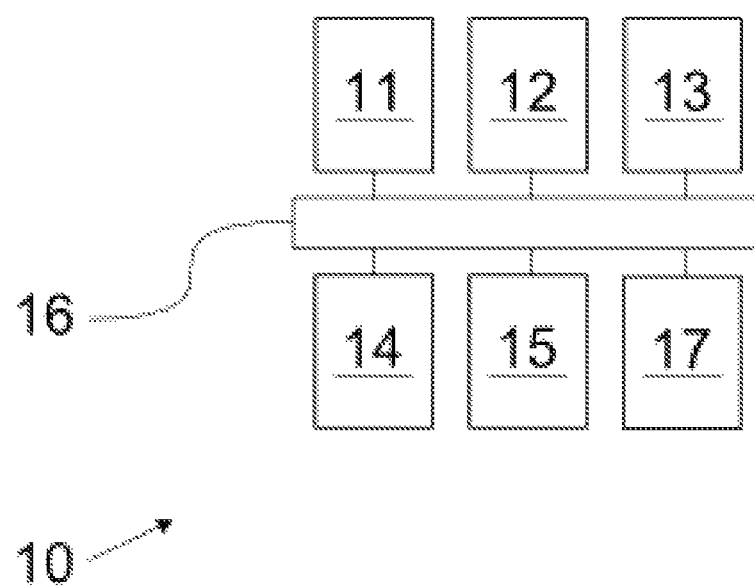
FIG. 1 illustrates a block diagram of the data terminal equipment.

As has been said in the above, the embodiment makes use of the acceleration sensors and positioning devices of the road users' data terminal equipment. Preferable data terminal equipment units 10 for the embodiment include mobile phones (FIG. 1). Most so-called intelliphones are namely equipped with a software-readable acceleration sensor 11 and positioning means 12, such as a satellite positioning system. Especially the phones by Nokia and other manufacturers having a Symbian 60 operating system include such sensors in nearly all new models. The data of the sensors are available via the interface 16 provided by the operating system for various applications. The data terminal equipment 10 according to the embodiment includes a software interface 16 provided with a software-readable acceleration sensor 11 for measuring acceleration values and positioning means 12. The positioning means 12 can basically be any means allowing informing the position of the data terminal equipment 10 to the server. According to an embodiment the positioning means are satellite positioning means, such as a GPS positioning apparatus which the navigation software 17 is arranged to use over the software interface 16. The navigation software 17 is additionally arranged to communicate with the road user via user interface 15. The data terminal equipment 10 additionally includes communication means 14 for forming a mobile connection with the server. The data communication means 14 may include a port and a protocol for transmitting packet-based data. Data transfer formats may include 3G, GPRS and the like. Mobile phones as described above are known per se. Current software interfaces 16 allow production of a program for combining the operation of a suitable navigation application 17 and the acceleration sensor rather easily. According to the embodiment the road user can be supplied with an auxiliary program integrating the software of the data terminal equipment or, alternatively, a new navigation program comprising in itself a program suite combining an acceleration sensor 11, positioning means 12 and road traffic means 14. In this connection data terminal equipment means an apparatus assembly comprising the said functional elements. For carrying out the embodiment the data terminal equipment can include a number of physically separate apparatuses arranged to be connected with each other so that the assembly forms data terminal equipment carrying out the above-mentioned functional elements. For example, the positioning means can be a GPS positioning apparatus separate from the mobile phone, communicating with the mobile phone via, e.g. a Bluetooth connection.

The following illustrates how the acceleration sensor of the data terminal equipment can be used for producing data about the friction between the vehicle and the road surface.

The only unambiguous measurement of slipperyness caused by weather or any other reason is friction coefficient describing the relation between the horizontal force of tyre of the vehicle or other friction surface and the vertical force against the road surface caused by the weight of the vehicle. When observing a pneumatic rubber tyre of a car and the road surface the friction coefficient of dry road is usually about 0.8 and it fluctuates about twenty percent mainly depending on the quality of the tyres and the road surface. In case the road gets slippery due to freezing, the friction coefficient can drop to even a value of 0.2, corresponding with a four-fold braking distance in comparison with dry road. For example, when driving at a speed of 100 km/h, the braking distance on dry road is about 50 metres, but on icy road the braking distance can increase to over 200 metres.

Using the laws of physics it can be shown that the friction coefficient is the same as the acceleration reached in braking with locked brakes, i.e. the change of velocity during a time unit, if the acceleration is defined relative to the gravity acceleration of the earth ($g=9.81$ m/s2). As acceleration is a vector quantity, in this context acceleration also includes deceleration, i.e. acceleration in the opposite direction. Thus, the level of slipperyness on the chosen portion of road can be determined, if the maximal acceleration on said portion of road is known. For example, if the car is strongly braked while the car is moving, the wheels of the car can partially lock or at least slide so that the wheels rotate along their periphery a smaller distance than the car advances. Also in this situation the acceleration reading measured in the direction of driving divided by the gravity acceleration of the earth is in practice the same as the friction coefficient between the wheels of the car and the surface of the road and thus a measurement of slipperyness.

The advantage of friction measured by means of an acceleration sensor is the fact that the measurement is absolute with no need for work-intensive calibration. It is sufficient to measure the relation of the acceleration to the gravity acceleration of the earth. The friction meter can be used for all possible tyre friction measurement applications. it is primarily applicable to measuring the slipperyness caused by the weather either for the road user's own use or for use by winter maintenance or the media. The friction meter is also at its best as help for accident research.

According to this principle, an application can be developed for data terminal equipment, preferably a mobile phone, the application utilizing the acceleration values monitored by the data terminal equipment for determining the friction between the vehicle and the surface of the road. Further, the results from the acceleration sensors of mobile phones are most often produced in 3D. The determining can basically be done with any data terminal equipment, but in the embodiment an advantageous data terminal equipment s a mobile phone. When using mobile phones for measurements in road traffic applications, the ready communication connections, satellite positioning data, camera and a large saving capacity are further advantages.

The application installed in the phone is programmed for the measurement according to the following embodiment. When the application is started, it will begin to integrate the acceleration readings of all three normal directions with a slow response. If the phone is fixed in the car, such as in a stand, in the pocket of the driver or it is otherwise nearly immobile in relation to the car, the acceleration vector shows on average in the direction of the gravity of the earth. In this case the acceleration in some direction can be seen as changes in relation to the vector. In other words, the measured acceleration vector, minus the unit vector in the direction of the gravity acceleration of the earth describes the horizontal acceleration of the car. When driving straight, this acceleration is a vector in the direction of the movement during braking and a vector in the opposite direction during acceleration. When driving in a curve, the central acceleration causes a lateral acceleration component to the equation. During calibration, the position of the phone in relation to the car can be analysed from acceleration components measured by the acceleration sensor and the unit vectors for the driving direction and the lateral direction can be determined Subsequent to this, the measured acceleration values can be used for producing the desired accelerations as dot product with the corresponding unit vector.

If the phone is used for some other purpose during driving, in connection with which the phone is moved, the change of the direction of the gravity acceleration of the earth can be used for deducing the nature of the occurrence and the accelerations formed thus can be separated from the acceleration changes of the car. By programming the position recognition of the phone to be dynamic it is not even necessary to return the phone to its original position for the program to be able to normally continue acceleration measurement. Thus it is not necessary to have the phone fixedly installed in the car, but it can be left in a place where it stays in approximately the same position during normal braking.

Therefore the only necessary action for calibrating the phone is to measure the response caused by the gravity acceleration of the earth once in each normal direction, i.e. when the phone is horizontally on its back, side and vertically, for example. In each position one of the acceleration components caused by the gravity of the earth differs from zero while the value of others is zero. By dividing the components of the measurement values with a non-zero response value of the corresponding direction the apparatus can be calibrated so that vector of the gravity acceleration of the earth is a unit vector. Thus, the dot products of acceleration measured during braking directly give the friction values corresponding to slipperyness or the lower limit of friction.

Alternatively the data terminal equipment can be calibrated so that the vehicle is braked during calibration, whereby the gravity acceleration component as well as the acceleration component in the direction of the driving direction can be determined The disclosed calibration method, however, requires that the data terminal equipment be fixedly installed in the vehicle, unlike in the previously described embodiment. In order to be able to determine the slipperyness with only one car, the car should be braked in the desired places sufficiently strong so that the wheels are blocked or that they at least reach the edge of losing traction. Alternatively the vehicle is accelerated so that the driving wheels slip. However, coefficient corrections will have to be made to the values measured with different vehicles depending on the traction of the vehicle. For example, the acceleration result of a two-wheel-driven car must be multiplied by a factor of about two to get the correct friction value. The accurate value of the coefficient depends on the division of mass of the car between the driving and non-driving wheels. Acceleration or braking can be distinguished by the plus and minus signs of the dot product.

Braking or accelerating sufficiently in congested traffic is not, however, very practical, and would also require active participation from the driver in carrying out the measurement. Therefore in the method according to the embodiment the aim is not to have ordinary drivers taking part in the actual measurement process but instead the method is based on saving maximum acceleration values collected during normal driving and collecting the data area or country-specifically on a centralized server. Generally, the operation of the slipperyness measurement method is based on the fact that the road user must periodically decelerate stronger than normally either due to a driving mistake or other reason, which automatically creates the slipperyness data. Thus the method requires a large user density for updating the data in nearly real time. In the beginning, the method can be used as an average slipperyness index of a large area, whereby the need for large user density is not that big. As user density increases, the accuracy of the location and time of the slipperyness index can be automatically improved.

A program installed in the server statistically analyses the collected acceleration readings and maintains position-specific maximum acceleration data. In case slipperyness increases at a certain area, the maximum acceleration readings of the area start to decrease in the collected data. This allows finding out the slipperyness data of the area. The reliability and response time of the system correlate with large user density. E.g. a free phone application also showing the slipperyness level on a navigation map could be use as an incentive for road users to start using the system. The system and method according to the embodiment for collecting the above-mentioned slipperyness data can be carried out by a number of ways.

Figure 2:
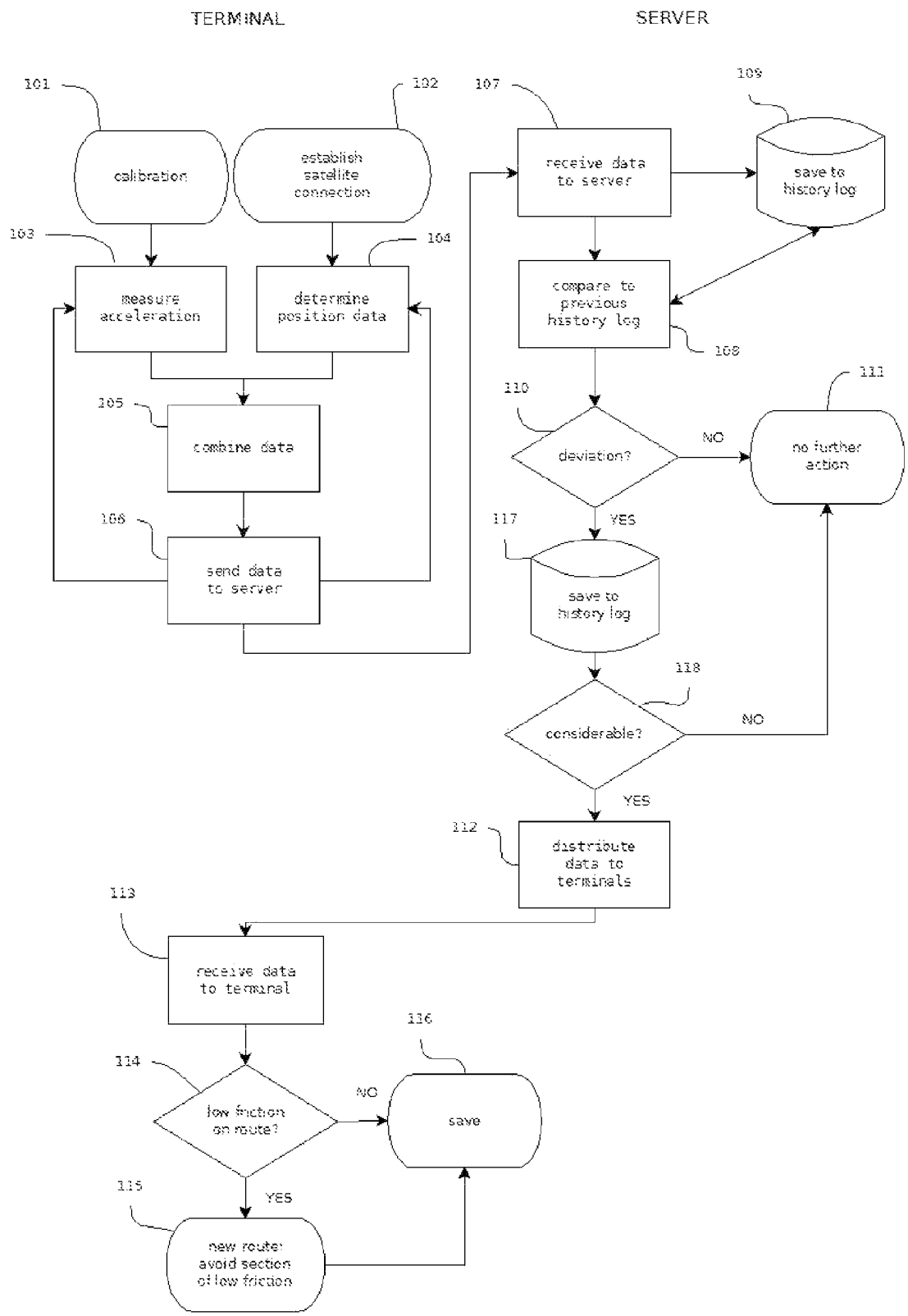
FIG. 2 is a flow diagram showing a method according to one embodiment.

According to one embodiment of the invention and as shown in FIG. 2, each data terminal equipment produces acceleration and position data which it sends to a server distributing information about exceptional conditions to each data terminal equipment. In the method the data terminal equipment is started whereby it is calibrated 101, as has been described above, in case the calibration hasn't been carried out earlier. In this connection the positioning means of the data terminal equipment is initialized, whereby according to one embodiment the satellite positioning apparatus receives satellite connection 102. The position data produced by the positioning means can be carried out by a number of ways. For example, with no satellite connection the positioning data can be produced by means of, e.g. a base station of a mobile phone network. Satellite positioning, such as GPS, is preferably used, however. After the calibration 101 and forming the satellite connection 102 the data terminal equipment starts the acceleration measurement 103, during which vehicle position data is collected 104. At predefined intervals or when the acceleration sensor measures values exceeding a predefined value, the measured acceleration value and the position data during the acceleration value are combined 105 and the data are sent to the server 106 by means of a suitable mobile communications means. For the transmission, a message to be sent to the server is formed on the basis of the measured acceleration and position data. The content of the message can be, e.g. the measured horizontal acceleration and the coordinate or address produced by means of the positioning means. The content of the message can also be data in some other suitable form with acceleration or friction data and position data. The transmission may be made anonymously. The method for sending an anonymous method to a server via mobile connection is known technology. There can be one centralized server or the area, such as a county or a country, can be distributed for a number of servers communicating with each other. According to the embodiment described here there is one server.

The server receives the information 107 sent by the data terminal equipment and saves the information to a history log 109. The monitored acceleration vector and measurement position are saved in the history log. The history log is accumulated from all around the monitored area during a long period of time and from a number of users, whereby it is possible to create an extensive history information about the fluctuation of monitored acceleration values of each portion of road. It is easy to determine normal values for each portion of road e.g. for each time of day or each day of the week. When the information is saved in the history log, the received information is compared with the normal value 108. In case the value does not deviate from the normal 110, the server does not execute further actions 111.

In case the value, however, differs from the usual value 110, the information about the deviation is saved into the deviation log 117, subsequent to which the program of the server calculates with suitable algorithms whether the deviation is considerable 118. In case the deviation is not considerable, the server does not execute further actions 111. If the deviation is considerable, the information about the deviation is distributed—according to the embodiment of FIG. 2—to the data terminal equipment 112. According to the embodiment, the server distributes locally collected information centrally to at least one data terminal equipment unit, preferably to as many as possible. The said distribution can in practice be carried out according to the embodiment of FIG. 2 by sending a message or the distribution can be carried out so that the data terminal equipment download the updated data from the server independently. If the data terminal equipment has not been switched on, according to the embodiment the data terminal equipment updates the initial situation from the server to its database (not shown), otherwise the deviations produced before start-up of the program of the data terminal equipment are not updated. Also in this respect the server may be able to, in addition to distributing data, send data. With current data transfer methods sending and distributing are nearly equal.

Fuzzy logic or neural networks can, if necessary, be used for detecting a deviation in addition to conventional logic comparing characteristic figures. The deviation can, for example, be lower than normal average accelerations experienced at a certain area, possibly caused by decrease of friction. Alternatively the deviation can be related to starts and applications of brake caused by congested traffic, the occurrence density or distribution of which has clearly changed when compared with the history log at the said area or to measuring lower driving speeds from the same area that can be accessed from the current position data saved into the history log. Traffic congestion warnings issued on the basis of positioning data are known as such. When the data about the exceptional conditions are sent to the data terminal equipment 112, the data is received locally 113, subsequent to which the data terminal equipment determines whether the informed exceptional situation is on the planned or probable route 114 of the navigation program. If the data about the exceptional conditions are not the route, the data are saved in the memory 116 of the data terminal equipment and navigation continues in a normal way. If the deviation is on the route, the navigation program of the apparatus chooses a new route that does not traverse the road where the deviating values 115 have been observed. Alternatively, the navigation program can only warn the road user about exceptional conditions, such as decrease of friction. The information about the decrease of friction, traffic congestion or the like may be graphically displayed on the map of the navigation program. The server can also send messages of different levels to the data terminal equipment depending on the magnitude of the deviations. For example, a message about only slightly lowered friction can be sent, on the basis of which the data terminal equipment only warns the road user. If the measurements show a marked decrease of driving conditions, the sent message can require the data terminal equipment to choose a new route. Thus the road user can be warned about exceptional conditions already considerably before the decrease of friction has had a notable effect on the traffic.

Figure 3:
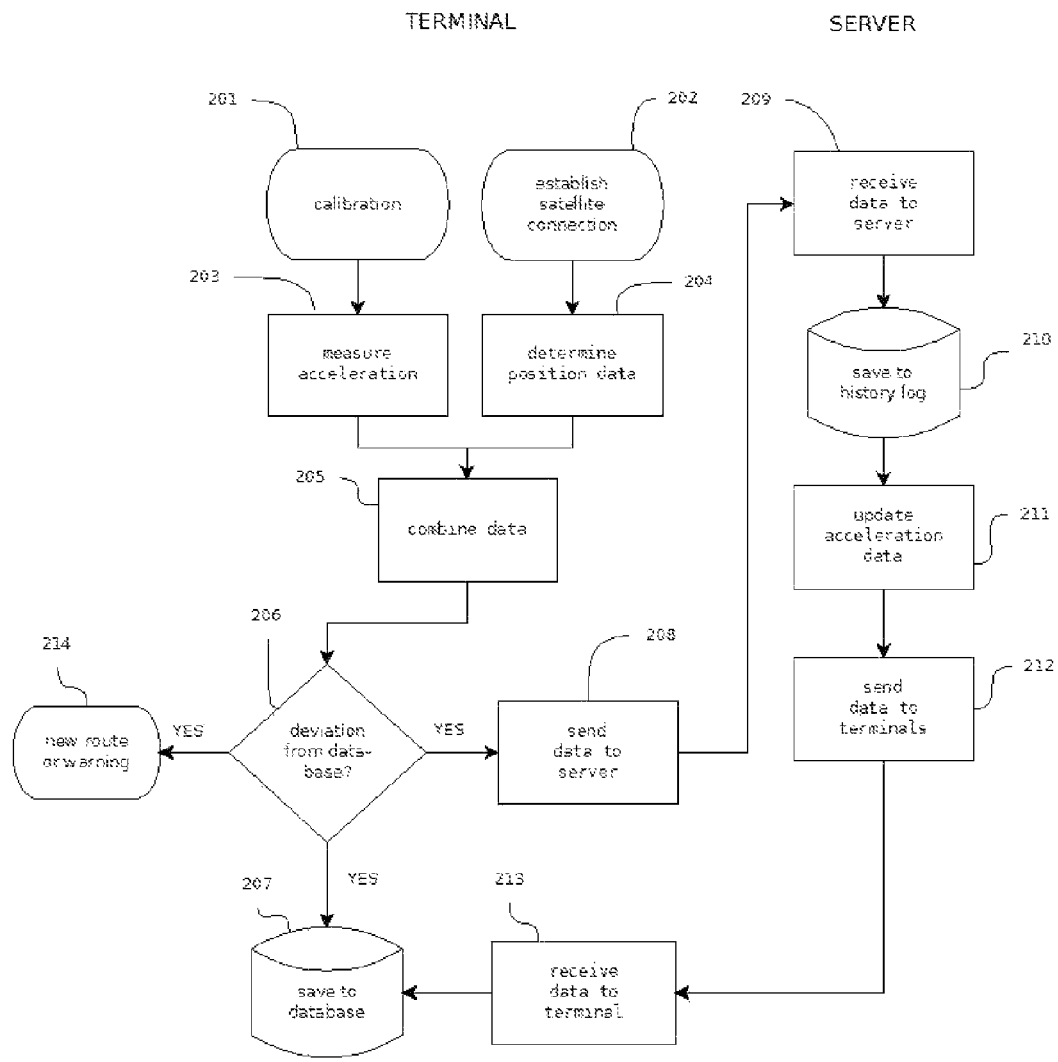
FIG. 3 is a flow diagram showing a method according to another embodiment.

As has been said, the method according to the embodiment for collecting and transmitting data about driving conditions can also be carried out in way different from the above-described embodiment. According to another embodiment and as can be seen in FIG. 3, after calibrating 201 and forming a satellite connection 202 the data terminal equipment continuously measures the horizontal acceleration 203. Because in current operator-based data communications solutions the owner of the phone pays for the data communication in one way or the other, there is reason to avoid unnecessary data communication. This can be achieved so that the server sends the best knowledge of the lower threshold friction in the said area based on the already collected data. Thus the data terminal equipment only needs to send the measurement values in case they are higher than the readings on the server. If the incoming data stream ends, the server can adjust the values sent slowly to be smaller, until an optimal data stream for the situation is achieved. This feedback allows the monitored maximum values to follow the actual slipperyness with minimal amount of data transfer from the phone to the server.

Similar to the embodiment of FIG. 2, in the embodiment of in FIG. 3 each acceleration value is combined with a position data 204, 205, produced by the positioning means. The acceleration value is compared to the value in the database 206. The server continuously collects the values of road users and continuously updates new friction values for each portion of road to the databases of the data terminal equipment. If the measured acceleration value does not differ from the value in the database, the new value is saved into the database 207. If the program of the data terminal equipment detects a larger acceleration value than that corresponding with the friction provided into the database by the server for the area or portion of the road, the program sends the detected reading with its position data to the server 208. The data terminal equipment also calculates a new route on which there is no differing i.e. lower friction or warns the driver about the decrease of friction depending on the magnitude of the deviation.

The server receives the data 209 and saves the updated data in its own location-specific, i.e. position-specific history log 210 for the portion of road for the maintained friction value applying suitably adjusted statistical principles. When a new value considerably changes the friction properties of an area, the server updates the friction data 210 of the area. The server sends the changed friction data back to all road users in the area or portion of road 212. If no new slipperyness data with more friction are received, the central machine slowly reduces the slipperyness reading for the area, until it again receives a higher reading. This provides a suitable feedback by means of which the slipperyness data maintained by the server for a chosen area or portion of road approaches the real friction. When the data terminal equipment has received a new value 213, the data terminal equipment saves it into its database 207.

Thus, according to the embodiment shown in FIG. 3, the data terminal equipment only send data to the server when the measured acceleration or its occurrence density or distribution or a combination thereof fulfill the threshold values set for the item in the database of the data terminal equipment. These threshold values are updated position-specifically as the server sends data into the database of the data terminal equipment. The magnitude and occurrence density of the difference are used as criteria for the creation of a different data and sending new threshold values to the data terminal equipment. For example, the threshold value of a friction data related to slipperyness at a certain point of road network can at some moment be 0.60. When the program in the data terminal equipment notices having measured an acceleration higher than the limit value, the data terminal equipment sends the measured value to the server. The program of the server saves the information and compares other readings recently received from the same area. If the number of differing readings is sufficient statistically or for the reliability of the system, the server updates the threshold value of the acceleration for the said location and sends the data to all data terminal equipment. Alternatively, the data terminal equipment can also actively fetch data from the server. If the server receives no measurements from a certain area, it drops the threshold value of acceleration a predefined amount in a certain time, such as 0.05 units in 1-10 minutes. When the threshold value has fallen to near the real maximum acceleration, the server starts to receive new measurements from the said area at an increasing rate. This feedback between the limit values and the measured maximum accelerations ensures fast updating of threshold values on the data terminal equipment. Hysteretic and dynamic behaviour can be affected by adjusting the magnitude of the decrease and the update criterion of the threshold values as the density of the data terminal equipment belonging to the system changes. Similar principle can be used for adjusting abnormal occurrence densities and distribution threshold values for determining congestion information.

The method according to the embodiment can also be carried out by means of a number ways not described here. As is disclosed in the above, the comparison of the measured position-specific acceleration data with the history data can be carried out locally in the data terminal equipment or centrally on the server or partly in both for optimizing the amount of data transfer. The method can also utilize acceleration and braking measurements of road maintenance personnel, the police, taxi drivers having made an agreement or other similar reliable users, whereby the information can be updated to the database without separate deviation observation and feedback as a ready slipperyness data. Sending of reliable data can also be provided with a separate signature by the measuring person as a difference to normal acceleration and braking. Instead of a signature it is also possible to use an accessory installed in the CAN bus of the car for transmitting information about slippage of the wheels startup of the ABS or vehicle stability program to the data terminal equipment by Bluetooth-technology or by a corresponding method. The slipperyness or acceleration data produced by the comparison is subsequently centrally distributed from the server to the road users' data terminal equipment. Also, all friction data can be distributed to all data terminal equipment units or only to those for which the data is supposed to be useful which requires that the data terminal equipment send its route data to the server. Additionally, in case of exceptional driving conditions the operation of the data terminal equipment can according to the embodiment be defined in a number of ways. As disclosed above, the navigation program can calculate a new route avoiding the exception point, it can warn the driver or calculate a new time estimate in case the driver does not want to change the route. In cases where the data terminal equipment is used on a normal route of the road user, such as a commute route, the normal route can be saved into the program of the data terminal equipment and the data terminal equipment can be programmed to automatically send an exception report to the server.

The method according to the embodiment allows providing the system with a number of additional functions as well. The software installed in the phone can, for example, analyse the overall traffic behaviour of the driver and form a sort of gas footprint for them. The gas footprint can statistically be compared to accident density, fully anonymously, if necessary, which most probably yields data difficult to obtain from the traffic behaviour of drivers in an accident situation. An accident situation can be monitored from accelerations greatly exceeding 1 g purely in the driving direction and perpendicularly to the gravity acceleration of the earth. Subsequent to observing an accident the system is according to one embodiment arranged to either inform authorities of the accident or alternatively to send a message to the data terminal equipment asking whether the road user wants to call help.

On the other hand the present embodiment relates to a system for collecting and transmitting data about driving conditions. The system according to the embodiment includes at least one server arranged to receive and transmit data. The phones as described above are known per se. A server suitable for the embodiment includes an operating system for controlling the server as well as means for forming a data transfer connection between the operating system and the data communications network. The server may be reserved with an extensive and fast memory for saving the proficient amount of data. The server further includes a map template saved in the memory of the server or which can be downloaded from the network. The server is arranged to receive acceleration and position data from a number of data terminal equipment by means of the data communications means and to arrange the data onto the map template and to save the received acceleration data to the position-specific history log of the memory. The software of the operating system of the server is naturally provided with a program, logic circuit or the like arranged to compare the received position-specific data with the previous history log of the memory. The program is additionally arranged to distribute the message to a number of data terminal equipment via a data communications interface. The server is alternatively arranged to distribute messages about exceptional conditions so that the data terminal equipment actively get the message from the server. The comparison and sending logic of the program depends on the embodiment of the method to be carried out, the programming of the logic being considered to be known to one skilled in the art.

The system additionally includes a number of data terminal equipment used by the road users, the equipment comprising positioning means, e.g. a satellite positioning means, such as a GPS positioning means or the like. The data terminal equipment also includes data communications means for forming a mobile connection to the server. The data terminal equipment are arranged to send position data of the positioning means via the mobile connection formed to the server, which is known per se. The data terminal equipment further include an acceleration sensor and they are arranged to transmit and receive data collected on the server by means of the acceleration sensors via the formed mobile connection.

TABLE 1

Reference numbers.

| number | part |
|---|---|
| 10 | data terminal equipment |
| 11 | acceleration sensor |
| 12 | positioning means |
| 13 | saving means |
| 14 | data communications means |
| 15 | user interface |
| 16 | software interface |
| 17 | navigation program |
| 101 | calibrating the data terminal equipment |
| 102 | initiating the satellite connection |
| 103 | continuous measurement of acceleration |
| 104 | determining position data via the satellite connection |
| 105 | combining the acceleration and position data |
| 106 | sending the combined data from the data terminal equipment to the server |
| 107 | receiving the combined data on the server |
| 108 | comparing the data with the history log |
| 109 | position-specific saving of the data in the history log |
| 110 | comparing whether the received data differs from the history data |
| 111 | no actions |
| 112 | data about the deviation is distributed to the data terminal equipment |
| 113 | receiving the data about the deviation distributed by the server |
| 114 | comparing the position data of the message with the planned or probable route |
| 115 | calculating a new route not traversing the position data of the deviation |
| 116 | saving the data about the deviation |
| 117 | saving the deviation in the deviation log |
| 118 | comparing whether the deviation is considerable |
| 201 | calibrating the data terminal equipment |
| 202 | initiating the satellite connection |
| 203 | continuous measurement of acceleration |
| 204 | determining position data via the satellite connection |
| 205 | combining the acceleration and position data |
| 206 | comparing whether the measured position-specific acceleration differs from the history data of the database |
| 207 | saving the new data into the database |
| 208 | sending a message about the deviation and values to the server |
| 209 | receiving the message on the server |
| 210 | saving the new data into the history log |
| 211 | updating the new data statistically |
| 212 | sending a message about the new value to a number of data terminal equipment |
| 213 | receiving the message in the data terminal equipment |
| 214 | choosing a new route on the basis of the deviation or a new travel time estimate or warning the road user about the deviation |

The invention claimed is:

1. A method for producing slipperyness data about driving conditions by means of a mobile phone located in a vehicle, the method comprising the steps of:
    measuring acceleration of the vehicle by means of an acceleration sensor of the mobile phone located in the vehicle,
    monitoring a position of the vehicle by means of a positioning means of said mobile phone located in said vehicle,
    combining, in said mobile phone, the measured acceleration value with position data of the monitored position,
    comparing whether the combined measured position-specific acceleration value exceeds a value for that area received from a server, and
    in case it exceeds, sending, by said mobile phone the measured position-specific acceleration value to the server, wherein slipperyness data about driving conditions is produced by the steps performed in said mobile phone.

2. A method according to claim 1, wherein a message to be sent to the server on the basis of the measured acceleration and position data is formed and the said message is sent to the server via mobile connection.

3. A method according to claim 2, wherein the position-specific acceleration data is received from the server and saved into the database of the mobile phone.

4. A method according to claim 2, wherein a slipperyness warning is issued or a new route is calculated in case a current or planned route contains position-specific acceleration or friction data corresponding with low friction according to the database of the mobile phone.

5. A method according to claim 1, wherein position-specific acceleration data is received from the server and saved into the database of the mobile phone.

6. A method according to claim 5, wherein a slipperyness warning is issued or a new route is calculated in case a current or planned route contains position-specific acceleration or friction data corresponding with low friction according to the database of the mobile phone.

7. A method according to claim 1, wherein a slipperyness warning is issued or a new route is calculated in case a current or planned route contains position-specific acceleration or friction data corresponding with low friction according to the database of the mobile phone.

8. A non-transitory computer readable medium having stored thereon a set of computer implementable instructions for controlling a mobile phone for carrying out a method of producing friction data about driving conditions, wherein the computer software product comprises software means for controlling the mobile phone for carrying out the following steps:
measuring acceleration of a vehicle by means of an acceleration sensor in the mobile phone,
monitoring a position of the vehicle by means of a positioning means in the mobile phone,
combining, in said mobile phone, the measured acceleration value with position data of the monitored position,
comparing whether the measured position-specific acceleration value exceeds a value for that area received from a server, and
in case it exceeds, sending the measured position-specific acceleration value to the server.

9. A server configured to communicate with a mobile phone belonging to a group of mobile phones, the server comprising:
a non-transitory computer readable memory having a position-specific history log stored thereon,
a means for receiving data produced by an acceleration sensor and a positioning means of the mobile phone from a number of mobile phones,
a means for saving the received data into the position-specific history log on the memory,
a means for comparing the received position-specific data with the previous data in the history log, and
wherein the server is also arranged to form position-specific acceleration data that can be transferred to a number of mobile phones, if the position-specified acceleration value received from the mobile phone is higher than the previous position-specific acceleration value of the history log of the server.

10. A server according to claim 9 being arranged to reduce a slipperyness reading of a certain area until it receives a new, larger reading, forming a feedback by means of which the slipperyness data maintained for the chosen area or portion of road by the server approaches actual friction.

11. A server according to claim 10 being arranged to form a message from the position-specific acceleration data and arranged to distribute said message to a number of mobile phones.

12. A server according to claim 9 being arranged to form a message from the position-specific acceleration data and arranged to distribute the said message to the number of mobile phones.

13. A method of producing friction data about driving conditions on a server, the method comprising the steps of:
receiving position-specific data produced by means of an acceleration sensor and a positioning means of a mobile phone from a number of mobile phones,
saving the received data into a position-specific history log of a memory,
comparing the received position-specific data with a previous history log of the memory,
forming position-specific acceleration data that is transferred to a number of mobiles phones, if the position-specific acceleration value received from the mobile phone is higher than a previous position-specific acceleration value of the history log of the server.

14. A method according to claim 13, in which a slipperyness reading of a certain area is reduced until a new, larger reading is received, thus forming a feedback by means of which the slipperyness data maintained for the chosen area or portion of road by the server approaches actual friction.

15. A non-transitory computer readable medium having stored thereon a set of computer implementable instructions for controlling a server for carrying out a method of producing friction data about driving conditions, the computer software product comprising software means for controlling a mobile phone for carrying out the following steps:
receiving data produced by means of an acceleration sensor and a positioning means of the mobile phone from a number of mobile phones,
saving the received data into a position-specific history log of a memory,
comparing the received position-specific data with the previous history log of the memory, and
forming position-specific acceleration data that is transferred to the number mobile phones, if the position-specific acceleration value received from the mobile phone is higher than a previous position-specific acceleration value of the history log of the server.

* * * * *